United States Patent [19]

Kosintsev et al.

[11] 4,206,189

[45] Jun. 3, 1980

[54] METHOD OF PRODUCING HYDROGEN FLUORIDE AND SILICON DIOXIDE FROM SILICON TETRA-FLUORIDE

[76] Inventors: Feoktist I. Kosintsev, ulitsa Lenina, 213, kv. 16; Vladimir G. Novikov, ulitsa 50-let VLKSM, 36/3, kv. 36, both of Stavropol; Viktor Y. Belov, kvartal 106, dom. 6, kv. 8, Angarsk, Irkutskoi oblasti; Vasily P. Popov, ulitsa Lenina, 397/7, kv. 67, Stavropol; Viktor V. Snizhko, ulitsa Pugacheva, 38, kv. 7, Konstantinovka Donetskoi oblasti; Anatoly S. Pronovich, ulitsa 50-let VLKSM, 36/3, kv. 36, Stavropol, all of U.S.S.R.

[21] Appl. No.: 866,776

[22] Filed: Jan. 3, 1978

[30] Foreign Application Priority Data

Jan. 4, 1977 [SU] U.S.S.R. ............................. 2440799
Jan. 4, 1977 [SU] U.S.S.R. ............................. 2441113

[51] Int. Cl.$^2$ ..................... C01B 33/18; C01B 7/22
[52] U.S. Cl. ................................. 423/336; 423/483; 423/488; 423/531
[58] Field of Search ............... 423/336, 337, 240, 483, 423/484, 488, 531

[56] References Cited

U.S. PATENT DOCUMENTS

| | | |
|---|---|---|
| 2,819,151 | 1/1958 | Flemmert . |
| 2,886,414 | 5/1959 | Secord . |
| 3,087,787 | 4/1963 | Flemmert . |
| 3,110,562 | 11/1963 | Hinkle . |
| 3,969,485 | 7/1976 | Flemmert ............................ 423/337 |

FOREIGN PATENT DOCUMENTS

| | | | |
|---|---|---|---|
| 505315 | 8/1954 | Canada | ..................................... 423/336 |
| 1011234 | 11/1965 | United Kingdom . | |
| 1022448 | 3/1966 | United Kingdom . | |
| 1445139 | 8/1976 | United Kingdom . | |
| 475836 | of 0000 | U.S.S.R. | |

OTHER PUBLICATIONS

Takagi et al., "Report of Research Laboratory, Asahi Glass Company", Japan, 1967.

*Primary Examiner*—Jack Cooper
*Attorney, Agent, or Firm*—Haseltine, Lake & Waters

[57] ABSTRACT

The method resides in that silicon tetrafluoride is subjected to water hydrolysis in the presence of sulphuric acid, the reactants being in an aerosol state.

Hydrolysis is performed at a volume ratio of silicon tetrafluoride to sulphuric acid equal to 40:1–80:1, concentration of sulphuric acid within the range of 45–73 wt. %, and the rate of silicon tetrafluoride flow in the reaction zone of 0.2–4.0 m/sec. The process is run at room temperature and atmospheric pressure.

As a result of hydrolysis, silicon dioxide and fluorine-containing sulphuric acid solution are obtained, hydrogen fluoride being extracted from the solution upon heating.

The proposed invention makes possible an effective use of silicon tetrafluoride with maximum conversion of the components thereof into end products, separation of the end products taking place simultaneously with the formation thereof. The yield of the products reaches 92–95 wt. % of their content in the initial raw material.

4 Claims, 1 Drawing Figure

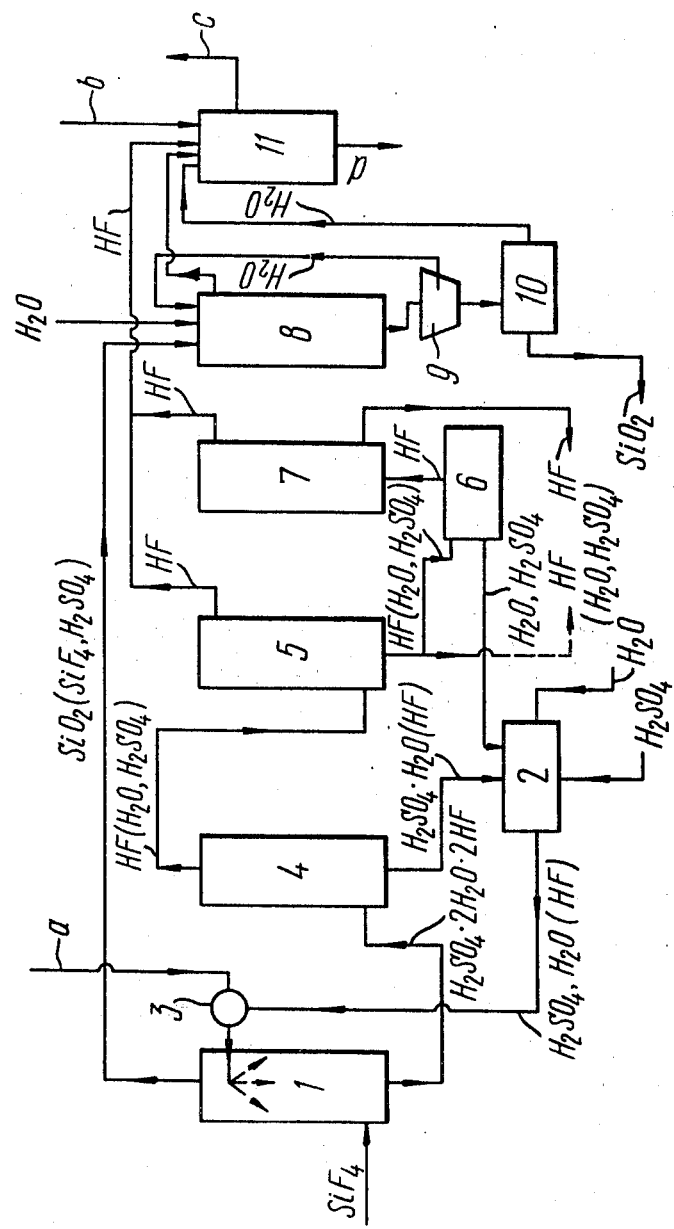

METHOD OF PRODUCING HYDROGEN FLUORIDE AND SILICON DIOXIDE FROM SILICON TETRA-FLUORIDE

FIELD OF APPLICATION

The present invention relates to methods of producing hydrogen fluoride and silicon dioxide and more particularly to methods of producing hydrogen fluoride and silicon dioxide from silicon tetrafluoride.

Application of hydrogen fluoride and silicon dioxide as raw materials and reactants is constantly growing in various branches of industry and engineering. Hydrogen fluoride is used in production of such important chemicals as organofluorine compounds (fluorinated plastics, freons, etc.), inorganic fluorides (cryolites, sodium and aluminum fluorides) for aluminum production, fluoride optical materials, oxidants for rocket engineering, fluoride inorganic compounds for atomic engineering, etc. Hydrogen fluoride is one of the components of raw materials in electrolytic production of elemental fluorine which is one of the most active oxidants. World production of hydrogen fluoride is constantly increasing and amounts to many dozens of thousands of tons per year. Hydrogen fluoride is used for the above-cited purposes in the form of two commercial products, namely, non-aqueous hydrogen fluoride and an aqueous solution with hydrogen fluoride content 38–41% (so-called hydrofluoric acid).

Silicon dioxide is used in the technical rubber industry as a filler for rubber stocks and as a raw material in the optical, radio engineering, electronic glass-making, and other industries. It is the main component in compositions for manufacturing luminophores, sorbents for chromatography, etc. Output and consumption of silicon dioxide also grows continuously in all industrially developed countries. Depending on its particular applications silicon dioxide is produced in various modifications and grades. Often the requirements on purity of silicon dioxide are much more stringent than those imposed on hydrogen fluoride and the cost of silicon dioxide is considerably higher than the cost of hydrogen fluoride.

BACKGROUND OF THE INVENTION

At present the only industrial method of producing hydrogen fluoride is sulfuric acid decomposition of mineral raw material, namely, fluorspar. As the end product either hydrofluoric acid is obtained (38–41% aqueous solutions of hydrogen fluoride) or non-aqueous hydrogen fluoride, which depends on the production technology. The composition of the end product depends on the quality of the initial fluorspar. Fluorspar with a calcium fluoride content less than 45 wt. % is not used for producing hydrogen fluoride. To obtain non-aqueous hydrogen fluoride, fluorspar is needed with a content of calcium fluoride no less than 95–97 wt.%.

The technological scheme of the known method consists of the following stages:

(a) decomposition of fluorspar with an acid at a temperature of 180°–250° C. according to the reaction:
$CaF_2 + H_2SO_4 \rightarrow CaSO_4 + 2HF$ (b) purification of the gases of fluorspar decomposition from impurities of fluorspar particles, sulfur- and phosphorus-containing compounds, and other components;

(c) absorption of purified gases with water in order to obtain solutions of hydrofluoric acid (if production of non-aqueous hydrogen fluoride is not envisaged);

(d) condensation of purified gases. If non-aqueous hydrogen fluoride is the final product of the production, purified gases of fluorspar, decomposition are subjected to condensation for extracting hydrogen fluoride by cooling down to a temperature of minus 5°–10° C. The obtained condensate of hydrogen fluoride (the so-called "crude") is purified from the main impurities ($H_2O$, $H_2SiF_6$, $H_2SO_4$) by rectification; hydrogen fluoride is obtained as a commercial product in non-aqueous liquid state.

However, the cost of hydrogen fluoride, especially in non-aqueous liquid state, obtained by following the known technology is rather high, which limits the field of its application in various branches of industry. In addition, this method requires considerable amounts of raw materials, chemicals, and energy, highly resistant anticorrosive materials, and is technologically complicated. At the same time, as high-grade mineral fluorspar is being consumed, which means that its resources are reduced, the cost of hydrogen fluoride and criticality constantly grow. Therefore, new types of phosphorus-containing raw material are sought for and methods of processing it into hydrogen fluoride are being developed. A similar situation is observed in the production of silicon dioxide, especially in connection with imposing more stringent requirements on its purity in a number of industries (optics, electronics, luminophores, etc.).

Silicon dioxide is produced by various methods depending on the requirements as to its purity. Among them are: combustion of wastes of agricultural production, treatment of natural sands, oxidation of silicon tetrachloride in plasma burners, treatment of silicic acids isolated in the utilization of effluent gases in the production of phosphorus-containing mineral fertilizers, etc.

As is known, production of phosphorus-containing mineral fertilizers in the chemical industry is based on sulphuric-acid decomposition of apatites and phosphorites containing fluorine-ion in amounts of 2–5 wt.%. Almost the whole amount of fluorine-ion passes from raw material into a gaseous phase and is removed as a mixture of hydrogen fluoride with silicon tetrafluoride from the production process together with the effluent gases.

Utilization of fluorine-ion in the effluent gases from the production of phosphorus-containing fertilizers is performed at present mainly to avoid pollution of the environment with various fluorides. The utilization products are aqueous solutions of various fluorine salts of fluosilicic acid, the need for which is rather limited. It has been established that fluorine resources in superphosphate raw material amount to 1000 millions of tons (on a world-wide scale) as compared to 30 min. tons in fluorspar. In spite of the fact, that trapping of the fluorine-ion from the effluent gases of superphosphate production reaches 98%, utilization of this ion does not exceed 40–50 wt.%.

Fluorine-containing effluent gases of superphosphate production contain, mainly, such fluorides as silicon tetrafluoride and hydrogen fluoride; they are promising as a source of not only fluorine, but silicon as well. Various methods of producing hydrogen fluoride from silicon tetrafluoride have been proposed, taking into account considerable amounts of fluorine (in the form of silicon tetrafluoride and hydrogen fluoride) in the effluent gases from superphosphate production. Particular interest in processing silicon tetrafluoride is also determined by the possibility of complex processing of raw material and production of not only hydrogen fluoride but silicon dioxide as well. Such technology will ensure quality and cost of silicon dioxide which will be beyond competition with the currently employed methods of producing silicon dioxide from wastes of agricultural productions, from sands and such critical products of chemical industry and metallurgy as silicon tetrachloride, ferrosilicon, etc.

Methods of processing silicon tetrafluoride contained in the effluent gases into hydrogen fluoride and silicon dioxide can be classified into two groups, namely, direct and indirect.

Indirect methods are based on extracting silicon tetrafluoride from the effluent gases of superphosphate productions by absorption with water or aqueous solutions of alkali and salts, or by adsorption with solid salts with subsequent processing of the trapped products into hydrogen fluoride. Fluosilicic acid and silica gel (hydrated silicon dioxide) are the products of silicon tetrafluoride absorption with water; otherwise the products include aqueous or non-aqueous salts of fluorides or silicon fluorides of, mainly, alkali or alkali-earth elements or ammonium.

Thus, it is proposed in U.S. Pat. (No. 2,819,151 of 1958, No. 3,087,787 of 1963, and No. 3,551,098 of 1970) to sorb silicon tetrafluoride and hydrogen fluoride in the effluent gases from superphosphate production on sodium fluoride. In this case the following reactions take place:

$$SiF_4 + 2NaF \rightarrow Na_2SiF_6$$

$$HF + NaF \rightarrow NaF \cdot HF$$

Extraction of hydrogen fluoride from a mixture of solid salts of sodium bifluoride and silicon fluoride is proposed to be run with heating up to a temperature 320°–360° C.; the remaining mixture of silicon fluoride and sodium fluoride can be used either for extracting silicon tetrafluoride by heating the mixture up to 450°–500° C., or hydrogen fluoride by treating the mixture with sulphuric acid in a way similar to the decomposition of fluorspar.

In U.S. Pat. Nos. 3,218,124, 3,218,125, 3,218,126, 3,218,128 of 1965 and in Inventor's Certificate of the USSR No. 159.806 of 1964 it is proposed to trap silicon tetrafluoride from the effluent gases of superphosphate production with water. Fluosilicic acid thus obtained is filtered from silica gel; purified acid having a concentration of 6–12 wt.% is subjected to dehydration with concentrated sulphuric acid (concentration of sulphuric acid is no less than 90–92%). Upon dehydration fluosilicic acid decomposes to silicon tetrafluoride which is then returned into the process, and hydrogen fluoride sorbed by sulphuric acid. Hydrogen fluoride is extracted from a mixture of sulphuric and fluosilicic acids either by heating above 150° C. or by extraction with hexane or trinonylamine. The reactions taking place are described by the following equations:

$$3SiF_4 + 3H_2O = 2H_2SiF_6 + H_2SiO_3$$

$$2H_2SiF_6 + 2H_2SO_4 = 2SiF_4 + 2[H_2SO_4 \cdot 2HF]$$

$$2[H_2SO_4 \cdot 2HF] = 2H_2SO_4 + 4HF$$

Besides, in British Patent (No. 963,089 of 1964), U.S. Patent (No. 3,195,979 of 1965) and in patents of other countries it is proposed to treat the solutions of fluosilicic acid, obtained after sorption of silicon tetrafluoride, with water, with ammonia solution and then to separate the products of acid decomposition:

$$3SiF_4 + 3H_2O = 2H_2SiF_6 + H_2SiO_3$$

$$2H_2SiF_6 + 12NH_4OH = 12NH_4F + 2H_2SiO_3 + 6H_2O$$

The solution of ammonium fluoride, filtered from silica gel, is evaporated up to the formation of ammonium bifluoride from which hydrogen fluoride is removed at a temperature of 150° to 170° C.:

$$2NH_4 \rightarrow NH_3 \cdot 2HF + NH_3$$

$$NH_3 \cdot 2HF \rightarrow NH_4F + HF$$

In patent literature there is a considerable body of examples similar to the above-cited on indirect treating silicon tetrafluoride. But they all have the main disadvantages complicating their practical application: the necessity of operating with large volumes of aqueous solutions of weak acids and salts, separation of silica gel and fluorine-containing compounds by filtration, complexity of processing the obtained fluorine compounds into hydrogen fluoride (in the majority of cases similar to decomposition of fluorspar with sulphuric acid), and impossibility of using silica gel for producing a side product (silicon dioxide) because of a considerable amount of impurities in it.

Therefore, attempts were made to simplify the process and to develop direct methods of processing silicon tetrafluoride. A method has been proposed, according to which silicon tetrafluoride, without being separated from gases of superphosphate production, is subjected to hydrolysis with steam at 500°–900° C. (U.S. Pat. No. 3,087,787). As a result of hydrolysis, a mixture is formed, consisting of silicon dioxide and hydrogen fluoride, according to the reaction:

$$SiF_4 + 2H_2O \rightarrow 4HF + SiO_2.$$

It is proposed to separate silicon dioxide from the mixture by filtration on cermet or ceramic filters at a temperature no less than 175°–220° C. But only 50% of silicon dioxide is separated by this method: the rest of silicon dioxide together with hydrogen fluoride is passed through sodium fluoride. Sorption of a mixture HF+SiO$_2$ on sodium fluoride leads to the formation of a mixture of solid silicon fluoride and sodium bifluoride:

$$SiO_2 + 6HF + 4NaF \rightarrow 2[NaF \cdot HF] + Na_2SiF_6.$$

Hydrogen fluoride is separated from this mixture by heating to 300°–350° C.; the remaining part is either discharged or processed by decomposition with sulphuric acid.

It is also proposed to burn the effluent gases from superphosphate production in a stream of oxygen or unsaturated hydrocarbons at 420°–1700° C. (U.S. Pat. No. 3,110,562 of 1963). As a result of the formation of water vapors and their presence in a gas flow at high temperatures, hydrolysis of silicon tetrafluoride takes place, giving hydrogen fluoride and silicon dioxide contaminated with silicon carbide. Separation of this mixture is proposed to be performed by filtration on filters, after which hydrogen fluoride is either trapped upon cooling with water or condensed with liberation of non-aqueous hydrogen fluoride.

In spite of the evident simplicity of direct methods of processing silicon tetrafluoride contained in the effluent gases, in these methods such major disadvantages are inherent as high temperatures of the process, the need for corrosion-resistant materials with respect to water vapors and hydrogen fluoride, complexity of the equipment and of the process of separating the mixture of silicon dioxide and hydrogen fluoride.

The authors of the present invention, by analyzing the chemical aspects of silicon tetrafluoride hydrolysis with water at room and elevated temperatures, have established that even at room temperature silicon tetrafluoride is hydrolyzed with the formation of silicon dioxide and hydrogen fluoride which, interacting with each other, form fluosilicic acid. Consequently, the end products of silicon tetrafluoride hydrolysis with water under ordinary conditions are silicon dioxide and fluosilicic acid but not hydrogen fluoride:

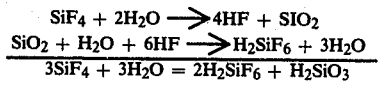

$$\frac{\begin{array}{l}SiF_4 + 2H_2O \longrightarrow 4HF + SiO_2 \\ SiO_2 + H_2O + 6HF \longrightarrow H_2SiF_6 + 3H_2O\end{array}}{3SiF_4 + 3H_2O = 2H_2SiF_6 + H_2SiO_3}$$

Thus, all the hitherto proposed methods for processing silicon tetrafluoride into hydrogen fluoride and silicon dioxide have technical and economic parameters much inferior to those of the method of producing hydrogen fluoride from fluospar, and therefore, have not found practical application.

OBJECT OF THE INVENTION

It is an object of the invention to provide a novel method of producing hydrogen fluoride and silicon dioxide from silicon tetrafluoride, which will simplify the process technology.

Another object of the present invention is to provide technology of the process of producing hydrogen fluoride and silicon dioxide which will ensure a high yield of these products.

It is also an object of the invention to decrease the consumption of raw materials and reagents per unit of the products obtained.

Still another object of the invention is to decrease power inputs for the process and to run the process under conditions close to normal.

A further object of the invention is to provide such technology of the process, which will ensure a considerable reduction in the content of noxious impurities in the gaseous and liquid wastes of the process.

SUMMARY OF THE INVENTION

A method of producing hydrogen fluoride and silicon dioxide from silicon tetrafluoride by hydrolysis thereof, according to the invention, is characterized in that silicon tetrafluoride is subjected to water hydrolysis in the presence of sulphuric acid, the reactants being in an aerosol state, at a volume ratio between silicon tetrafluoride and sulphuric acid equal to 40:1–80:1 and at a rate of silicon tetrafluoride in the hydrolysis zone from 0.2 to 4.0 m/sec, with subsequent separation of the formed silicon dioxide as aerosol and hydrogen fluoride as a fluorine-containing sulphuric acid solution from which hydrogen fluoride is extracted upon heating.

The invention makes possible an effective use of silicon tetrafluoride with maximum conversion of its components into the end products, separation of the hydrolysis products being performed simultaneously with the formation thereof. The yield of the products reaches 92–95% of their content in raw material.

According to the invention, hydrolysis of silicon tetrafluoride is recommended to be run with a sulphuric acid content from 45 to 73 wt.%.

With a sulphuric acid content higher than 73 wt.% hydrolysis of silicon tetrafluoride does not take place, since sulphuric acid completely binds water necessary for the hydrolysis. With a sulphuric acid content less than 45 wt.%, the amount of sulphuric acid is insufficient for complete binding of the liberated hydrogen fluoride into fluorine-containing sulphuric acid solution ($H_2SO_4.2H_2O.2HF$), as a result of which excess hydrogen fluoride begins to interact with silicon dioxide. This brings about a decrease in the yield of the end products and contamination of the fluorine-containing sulphuric acid solution with a considerable amount of fluosilicic acid.

According to the invention, hydrolysis of silicon tetrafluoride can be conducted at a temperature of minus 10° to plus 60° C., but the temperature of plus 20° to plus 30° C. is preferable.

Hydrolysis of silicon tetrafluoride proceeds effectively both upon cooling and upon moderate heating. But, in the case of cooling, additional consumption of coolants is required. At a temperature above plus 60° C. fluorine-containing sulphuric acid solution begins to decompose, which leads to evaporation of hydrogen fluoride into the hydrolysis zone, decreases the yield of hydrogen fluoride, and results in contamination of hydrogen fluoride with silicon dioxide. Therefore, it is not recommended to conduct hydrolysis at a temperature above 60° C., though it is possible. The performance of hydrolysis at temperatures of from minus 10° to plus 60° C. makes it possible to maintain in the reaction zone atmospheric or nearly atmospheric pressure.

As was mentioned above, hydrolysis of silicon tetrafluoride should be conducted with water in the presence of sulphuric acid, the reactants being in an aerosol state. Such state of the reactants ensures completeness of silicon tetrafluoride hydrolysis, since the contact surface is maximum. Besides, an aerosol state of the components prevents contamination of fluorine-containing sulphuric acid solution with silicon dioxide, thereby increasing the yield of silicon dioxide as an end product. As a result, there are no losses of silicon dioxide, and hydrogen fluoride is not contaminated. The main advantage of the aerosol state of the reactants, i.e. of water and sulphuric acid, is the possibility of complete and simple separation of the hydrolysis products, namely, silicon dioxide in an aerosol form and fluorine-containing sulphuric acid solution. Aerosol (dispersed) state of water and sulphuric acid (or aqueous solution of sulphuric acid) can be attained by various methods, for example, by compressed air, inert gas, with the help of mechanical spraying devices.

If hydrolysis of silicon tetrafluoride is conducted under the conditions violating an aerosol state of the components, the above-cited advantages of the process are not attained. According to the invention, as was mentioned above, the volume ratio of silicon tetrafluoride to sulphuric acid during hydrolysis should be equal to 40:1–80:1. When this ratio is higher than 80:1, silicon tetrafluoride is used incompletely, since a part of it passes through the hydrolysis zone without participating in the reaction and is removed together with silicon dioxide, thus contaminating the end product and decreasing its yield. If the ratio of silicon tetrafluoride to sulphuric acid is lower than 40:1, the fluorine-containing sulphuric acid solution is diluted with excess sulphuric acid, which complicates the separation of hydrogen fluoride from this solution.

According to the invention, the rate of silicon tetrafluoride movement in the hydrolysis zone is within the range from 0.2 to 4.0 m/sec. However, it is preferable to run the process at a gas rate from 0.7 to 0.9 m/sec, since under such conditions the separation of the hydrolysis products is complete. The aerosol phase consisting of silicon dioxide particles (with a size no more than 200 microns) is removed from the hydrolysis zone together with the spent gas flow, whereas a condensed phase consisting of fluorine-containing sulphuric acid solution is removed as a liquid. As a result, the fluorine-containing sulphuric acid solution thus obtained does not require purification from silicon dioxide.

A gas flow rate in the process below 0.2 m/sec is insufficient for removing silicon dioxide from the hydrolysis zone in an aerosol state, which results in contaminating the fluorine-containing sulphuric acid solution with silicon dioxide; this is inadmissible, since the yield of silicon dioxide decreases and hydrogen fluoride is contaminated with fluosilicic acid.

A gas flow rate higher than 4.0 m/sec leads to the entrainment of the fluorine-containing sulphuric acid solution together with aerosol particles of carbon dioxide by the gas flow leaving the hydrolysis zone, which sharply impairs the quality and yield of the end product.

Fluorine-containing sulphuric acid solution obtained after hydrolysis is subjected to heating within the temperature range from +60° to +220° C. for extracting hydrogen fluoride from it, the temperature being dependent on the composition of the solution. If fluorine-containing sulphuric acid solution ($H_2SO_4 2H_2O 2HF$) obtained in the process of hydrolysis is of optimum composition, i.e. with maximum saturation with respect to hydrogen fluoride and with minimum water content, heating can be conducted at lower temperatures (+60° to +100° C.). If the composition of the obtained solution is not optimum, heating is conducted at temperatures above +100° C.

In the present invention the term "silicon tetrafluoride" implies a gas flow consisting of pure silicon tetrafluoride or various gaseous mixtures of silicon tetrafluoride with air, inert gas, or steam, as well as effluent gases from the production of mineral phosphorus fertilizers.

The proposed process, according to the invention, makes it possible to obtain simultaneously two products from silicon tetrafluoride, namely, silicon dioxide and hydrogen fluoride (aqueous or non-aqueous) of high quality and in high yields (up to 98%). The invention reduces sharply the consumption of chemical reagents as compared to the known methods.

The use of sulphuric acid in the hydrolysis process intensifies the process and enables the separation of the hydrolysis products to be run in the same apparatus in which hydrolysis of silicon tetrafluoride takes place. In addition, the use of sulphuric acid, according to the invention, allows for performing the hydrolysis of silicon tetrafluoride at room temperature, which reduces power inputs and eliminates the necessity for using costly highly resistant anticorrosive structural materials.

One of the advantages of the proposed method consists in that its realization under industrial conditions is rather simple. Another advantage resides in that no wastes are formed which cannot be utilized, which occupy working space and contaminate the environment.

Due to the above advantages, the proposed method is commercially more favorable than all the known methods of producing hydrogen fluoride and silicon dioxide.

For a better understanding of the above-stated and other advantages of the invention, a detailed description and specific examples are given hereinbelow by way of illustration.

DETAILED DESCRIPTION

Detailed description of the invention is given with reference to the accompanying drawing which illustrates the flow sheet of the method of producing hydrogen fluoride and silicon dioxide from silicon tetrafluoride.

Into a reactor 1 gaseous silicon tetrafluoride is fed continuously at a rate of 0.2–4 m/sec, both in a pure form and in a mixture with air or other inert gases as well as in the form of effluent gases from the production of mineral phosphorus fertilizers, and an aqueous solution of sulphuric acid with a concentration of 45–73 wt.% preliminarily prepared in a reservoir 2. The sulphuric acid solution is fed into the reactor 1 in an aerosol state, atomization being obtained, for example, with compressed air introduced along line "a" into an injection sprayer 3. In the reactor 1 at a temperature from −10° to 60° C. silicon tetrafluoride is contacted with the aqueous solution of sulphuric acid, which is accompanied by hydrolysis of SiF with water and sorption of the formed HF by sulphuric acid in accordance with the following reactions:

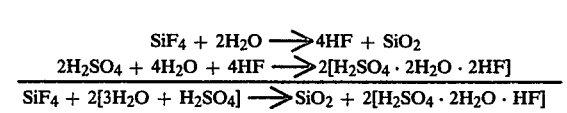

As a result of the above-cited reactions, finely-dispersed silicon dioxide (particle size less than 200 microns density, no more than 0.4 g/cm³) and fluorine-containing sulphuric acid solution are formed. When the flow of gaseous silicon tetrafluoride moves in the reactor 1 at a given rate, the aerosol particles of the sulphuric acid solution are not carried away, since these particles (size no less than 100 microns; density, 1.5–1.7 g/cm³) are not able to "hang" in the flow and are not carried away.

The fluorine-containing sulphuric acid solution is delivered from the reactor 1 and fed into a reactor 4 where, under the action of external heat, the solution is thermally decomposed at 60°–220° C. and hydrogen fluoride is separated into the gaseous phase:

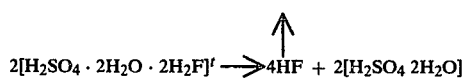

Gaseous hydrogen fluoride with the admixture of water vapors and sulphuric acid goes from the reactor 4 into a condenser 5, while the rest of the fluorine-containing sulphuric acid solution thermally decomposed (practically sulphuric acid only) is fed from the reactor 4 into the reactor 2 where it is used for preparing the aqueous solution of sulphuric acid which is returned for hydrolysis into the reactor 1.

In the condenser 5 gaseous hydrogen fluoride, under the action of externally fed cold, is condensed at a temperature from minus 5° to minus 15° C. into a liquid phase which contains a small amount of water and sulphuric acid. The obtained condensate can be used for preparing aqueous solutions of hydrogen fluoride as one of the forms of commercial formulations.

For preparing non-aqueous hydrogen fluoride, the condensate of hydrogen fluoride ("crude") is fed from the condenser 5 to a rectification system consisting of a heater 6 and a condenser 7. In the heater 6, under the action of external heat, pure non-aqueous hydrogen fluoride is evaporated, which is delivered into the condenser 7; the non-volatiles after the evaporation (practically sulphuric acid) are returned from the heater 6 into the reactor 2 for preparing the sulphuric acid solution which is then returned into the reactor 1 for hydrolysis.

In the condenser 7, under the action of external cold, at temperatures from minus 5 to minus 15 gaseous non-aqueous hydrogen fluoride is condensed into liquid non-aqueous hydrogen fluoride which is discharged from the condenser 7 as a commercial product.

Finely-dispersed silicon dioxide from the gas flow leaving the reactor 1 is trapped with water in the reactor 8 with the formation of polysilicic acids:

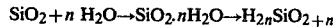

$$SiO_2 + n\ H_2O \rightarrow SiO_2 \cdot nH_2O \rightarrow H_{2n}SiO_{2+n}$$

Polysilicic acids from the reactor 8 are delivered to a filter 9 where they are filtered from excess water, this water being returned to the reactor 8 for trapping silicon dioxide. Polysilicic acids are extracted from the filter 9 as silica gel and subjected to heat treatment in an apparatus 10 for preparing crystalline and dry silicon dioxide. In the apparatus 10 water evaporates from silica gel at 100°–200° C. and silicon dioxide thus obtained is a commercial product.

Gaseous flow purified from silicon dioxide, leaving the reactor 8, uncondensed hydrogen fluoride from the condensers 5 and 7, and water vapors from the apparatus 10 are delivered to an apparatus 11 where the compounds containing fluorine-ions are trapped with sorbents introduced into the apparatus through line "b". The gaseous flow purified in the apparatus 11 is discharged into the atmosphere through line "c"; the spent sorbent goes into sewage through line "d".

For a better understanding of the present invention specific examples of carrying out the method of producing hydrogen fluoride and silicon dioxide from silicon tetrafluoride are given hereinbelow by way of illustration with reference to the accompanying drawing.

EXAMPLE 1

This example illustrates the influence of silicon tetrafluoride hydrolysis conditions on the compositions of the hydrolysis products.

Gaseous pure (100%) silicon tetrafluoride and an aqueous solution of sulphuric acid with a concentration of 60 wt.% are fed continuously into the reactor 1 at a weight ratio of silicon tetrafluoride to sulphuric acid equal to 62.5:1 and at a rate of silicon tetrafluoride flow in the reaction zone of 0.9 m/sec. Contacting of the phases is run at room temperature (+20° C.) and under atmospheric pressure. The aqueous solution of sulphuric acid, prior to delivering it into the reactor 1, is atomized into the aerosol state in an injection sprayer 3 with compressed air.

As a result of the total process of hydrolysis, the intermediate and end (commercial) products of the following compositions are obtained.

Fluorine-containing sulphuric acid solution is obtained in and discharged from the reactor 1:

(a) $H_2SO_4 = 56.5\%$   $H_2O = 27.2\%$
    $HF = 15.5\%$         $H_2SiF_6 = 0.8\%$   $H_2SiO_3 =$ traces.

Upon heating the fluorine-containing solution in the reactor 4, return sulphuric acid of the following composition is obtained:

(b) $H_2SO_4 = 67.28\%$   $H_2O = 35.52\%$
    $HF = 0.20\%$          $H_2SiF_6 =$ traces.

This acid is returned into the reactor 2 for preparing a solution of sulphuric acid which is delivered for hydrolysis into the reactor 1. In the reactor 4 a gaseous mixture is also obtained, consisting of hydrogen fluoride vapors and impurities of water with sulphuric acid; cooling of the mixture in the condenser 5 produces "crude" hydrogen fluoride in a liquid state of the following composition:

(c) $HF = 98.2\%$       $H_2O = 1.20\%$
    $H_2SO_4 = 0.3\%$    $H_2SiF_6 = 0.30\%$.

Rectification of the "crude" in the rectification system (the evaporator 6 and condenser 7) gives an end (commercial) non-aqueous hydrogen fluoride in a liquid state, of the composition:

(d) HF content no less than 99.9%;
    the total content of $H_2O$, $H_2SiF_6$, and $H_2SO_4$, no more than 0.1%.

Gas-air flow containing aerosol silicon dioxide, which leaves the reactor 1, is washed with water in the reactor 8. After washing wet silica gel is obtained, whose composition after drying on a filter 9 is as follows:

(e) $H_2SiO_5 = 97.5\%$   $H_2SO_4 = 0.8\%$
    $H_2O = 1.1\%$         $H_2SiF_6 = 0.6\%$

In the apparatus 10 drying and calcination of wet silica gel gives dry crystalline silicon dioxide which meets the requirements of an end (commercial) product:

(f) content of $SiO_2$ no less than 99.2%; particle density within 5 to 20 microns; the particle density is no more than 0.3 g/cm³; specific surface area is no less than 250–300 m²/g.

Efficiency of the hydrolysis process in the reactor 1 with respect to conversion of the fluorine-ion into non-aqueous hydrogen fluoride in fluorine-containing sulphuric acid solution is 99.8%, and with respect to conversion of silicon ion into aerosol silicon dioxide, 98.9%.

EXAMPLE 2

This example shows the influence of dilution of gaseous silicon tetrafluoride on the efficiency of silicon tetrafluoride hydrolysis and on the compositions of the hydrolysis products.

A gas-air mixture containing 5 vol.% of silicon tetrafluoride and 95 vol.% of dry air and an aqueous solution of sulphuric acid with a 60 wt.% concentration is continuously fed into the reactor 1 at a volume ratio of silicon tetrafluoride to sulphuric acid equal to 62.5:1. The rate of flow of said gas-air mixture in the phase reaction zone is 0.9 m/sec. Contacting of the phases is performed at room temperature (+20°) under atmospheric pressure. An aqueous solution of sulphuric acid, prior to delivering it into the reactor 1, is preliminarily atomized in the injection sprayer 3 with compressed air until an aerosol state is attained.

As a result of performing the hydrolysis process by following the procedure described in Example 1, intermediate and end (commercial) products are obtained with the following compositions:

(a) fluorine-containing sulphuric acid solution (in the reactor 1):

| 1) | $H_2SO_4$ = 56.2% | $H_2O$ = 28.6% | $H_2SiO_3$ — traces. |
|---|---|---|---|
| | HF = 14.9% | $H_2SiF_6$ = 0.2% | |

(b) return sulphuric acid (in the reactor 4):

| $H_2SO_4$ = 65.2% | $H_2O$ = 35.70% |
|---|---|
| HF = 0.1% | $H_2SiF_6$ = traces. |

(c) "Crude" hydrogen fluoride (in the condenser 5):

| HF = 98.5% | $H_2O$ = 1.10% |
|---|---|
| $H_2SO_4$ = 0.25% | $H_2SiF_6$ = 0.15% |

(d) Non-aqueous hydrogen fluoride (commercial or end product):
  content of HF, no less than 99.9%;
  the total content of $H_2O$, $H_2SiF_6$, and $H_2SO_4$, no more than 0.10%.

(e) Wet silica gel (from the filter 9):

| $H_2SiO_3$ = 96.5% | $H_2SO_4$ = 0.90% |
|---|---|
| $H_2O$ = 1.88% | $H_2SiF_6$ = 0.72% |

(f) Crystalline dry silicon dioxide (end or commercial product from the apparatus 10):
  content $SiO_2$, no less than 99.0%; particle size, 10–20 microns; the density of the particles, no more than 0.3 g/cm$^3$; specific surface area, no less than 220–250 m$^2$/g.

Efficiency of the hydrolysis process in the reactor 1 with respect to conversion of the fluorine-ion into non-aqueous hydrogen fluoride in fluorine-containing sulphuric acid solution is 99.0% and with respect to conversion of silicon ion into aerosol silicon dioxide, 98.7%.

EXAMPLE 3

This example illustrates the influence of contamination of a gas-air mixture containing silicon tetrafluoride with water vapors and dust-like aerosol particles on the efficiency of the hydrolysis process and on the composition of the hydrolysis products.

A gas-air mixture containing 5 vol.% of silicon tetrafluoride, 0.1 vol.% of water vapors, air being the rest, and filled with dust-like aerosol particles (phosphorus oxides, calcium sulphate, calcium phosphate and superphosphate of a total concentration of 40 g per liter of the gas-air mixture) is continuously fed into the reactor 1. Simultaneously an aqueous solution of sulphuric acid with a 60 wt.% concentration is also introduced into the reactor 1 at a weight ratio of silicon tetrafluoride to sulphuric acid equal to 62.5:1. Contacting of said gas-air mixture with sulphuric acid is performed at room temperature (20° C.) Under atmospheric pressure and at a rate of flow of said gas-air mixture in the reaction zone equal to 0.9 m/sec. An aqueous solution of sulphuric acid, prior to introducing it into the reactor 1 is atomized in the injection sprayer 3 with compressed air until an aerosol state is attained. As a result of the hydrolysis process performed by following the procedure described in Example 1, intermediate and end (commercial) products are obtained of the following composition:

(a) fluorine-containing sulphuric acid solution (in the reactor 1):

| $H_2SO_4$ = 39.05% | $H_2O$ = 51.15% | |
|---|---|---|
| HF = 7.2% | $H_2SiF_6$ = 2.60% | $H_2SiO_3$ = 0.05%; |

(b) return sulphuric acid (in the reactor 4):

| $H_2SO_4$ = 43.80% | $H_2O$ = 55.95% |
|---|---|
| HF = 0.25% | $H_2SiF_6$ - traces; |

(c) "crude" hydrogen fluoride (in the condenser 5):

| HF = 98.25% | $H_2O$ = 1.25% |
|---|---|
| $H_2SO_4$ = 0.15% | $H_2SiF_6$ = 0.35%; |

(d) non-aqueous hydrogen fluoride (commercial or end product):
  HF content, no less than 99.9%;
  total content of $H_2O$, $H_2SiF_6$, and $H_2SO_4$ no more than 0.10%;

(e) wet silica gel (from the filter 9):

| $H_2SiO_3$ = 94.0% | $H_2SO_4$ = 0.5% |
|---|---|
| $H_2O$ = 5.2% | $H_2SiF_6$ = 0.3% |

(f) crystalline dry silicon dioxide (end or commercial product from the apparatus 10):
  $SiO_2$ content, no less than 99.0%; particle size, 10–20 microns; density of the particles, no more than 0.40 g/cm$^3$; specific surface area, no less than 200 m$^2$/g.

Efficiency of silicon tetrafluoride hydrolysis in the reactor 1 with respect to conversion of fluorine-ion into non-aqueous hydrogen fluoride in fluorine-containing sulphuric acid solution is 81.5% and with respect to conversion of silicon-ion into aerosol silicon dioxide, 82.3%.

In spite of the presence in the gas-air mixture, going into the reactor 1 for hydrolysis, of such aerosol dust-like particles (impurities) as phosphorus oxides, calcium sulphate, calcium phosphate and superphosphate, their presence in the end products of hydrolysis of silicon tetrafluoride (non-aqueous hydrogen fluoride and crystalline silicon dioxide) is practically not observed. This is due to the fact that during hydrolysis said dust-like impurities are extracted by the fluorine-containing sulphuric acid solution formed in the reactor 1 and taken away with the solution; upon heating of said solution in the reactor 4, impurities remain mainly in the lower portion of the apparatus and only a small fraction of them returns with the sulphuric acid solution into the reactor 2 and then into the reactor 1. To eliminate the accumulation of considerable amounts of these dust-like impurities (the reactors 1, 2, 3, and 7) it is necessary to clean them at regular intervals from solid sediments.

EXAMPLE 4

This example illustrates the influence produced by the rate of silicon tetrafluoride flow in the reaction zone on the efficiency of silicon tetrafluoride hydrolysis and on composition of the hydrolysis products.

Gaseous pure silicon tetrafluoride (100%) and an aqueous solution of sulphuric acid with a 60 wt.% concentration are fed continuously into the reactor 1 at a volume ratio of silicon tetrafluoride to sulphuric acid equal to 62.5:1. Contacting of the phases is performed at room temperature (+20° C.) under atmospheric pressure. An aqueous solution of sulphuric acid, prior to the introduction into the reactor 1, is preliminarily atomized in an injection sprayer 3 with compressed air until an aerosol state is attained.

Hydrolysis of silicon tetrafluoride is conducted at the rates of its flow in the zone of contacting with sulphuric acid equal to 0.3, 0.7, 0.9, and 3.0 m/sec, respectively.

As a result of the hydrolysis process conducted by following the procedure described in Example 1, intermediate and end (commercial) products are obtained. The composition of the products and efficiency of silicon tetrafluoride hydrolysis are given in Table 1.

Table 1

| No. | Composition of the products and efficiency of hydrolysis | Gas flow rates, m/sec | | | |
|---|---|---|---|---|---|
| | | 0.30 | 0.70 | 0.90 | 3.0 |
| 1 | 2 | 3 | 4 | 5 | 6 |
| 1 | Composition of the products | | | | |
| 1 | Fluorine-containing sulphuric acid and solution (from the reactor 1) | | | | |
| | $H_2SO_4$ | 46.70 | 52.15 | 56.50 | 59.20 |
| | HF | 9.20 | 14.30 | 15.50 | 16.50 |
| | $H_2SiF_6$ | 8.10 | 0.92 | 0.80 | traces |
| | $H_2SiO_3$ | 4.30 | 0.05 | traces | traces |
| | $H_2O$ | 30.70 | 32.58 | 27.20 | 24.30 |
| 2 | Return sulphuric acid (from the reactor 4) | | | | |
| | $H_2SO_4$ | 54.40 | 61.08 | 67.28 | 70.90 |
| | HF | 2.50 | 0.40 | 0.20 | traces |
| | $H_2O$ | 42.30 | 38.50 | 35.52 | 29.10 |
| | $H_2SiF_6$ | 0.80 | 0.02 | traces | traces |
| 3 | "Crude" hydrogen fluoride (from the condenser 5) | | | | |
| | HF | 94.40 | 97.30 | 98.20 | 99.10 |
| | $H_2SO_4$ | 1.50 | 0.50 | 0.30 | 0.10 |
| | $H_2O$ | 2.50 | 1.80 | 1.20 | 0.80 |
| | $H_2SiF_6$ | 1.60 | 0.40 | 0.30 | traces |
| 4 | Non-aqueous hydrogen fluoride (from the condenser 7) | | | | |
| | HF | 99.80 | 99.8 | 99.9 | 99.9 |
| | total $H_2O$, $H_2SiF_6$, $H_2SO_4$ | 0.20 | 0.2 | 0.1 | 0.1 |
| 5 | Wet silicon dioxide (from the filter 9) | | | | |
| | $H_2SiO_3$ | 98.82 | 98.0 | 97.50 | 85.2 |
| | $H_2SO_4$ | 0.20 | 0.42 | 0.80 | 2.50 |
| | $H_2O$ | 5.70 | 0.55 | 1.10 | 9.70 |
| | $H_2SiF_6$ | traces | 0.20 | 0.60 | 2.60 |

Table 1-continued

| No. | Composition of the products and efficiency of hydrolysis | Gas flow rates, m/sec | | | |
|---|---|---|---|---|---|
| | | 0.30 | 0.70 | 0.90 | 3.0 |
| 1 | 2 | 3 | 4 | 5 | 6 |
| 6 | Quality of crystalline dry silicon dioxide (from the apparatus 10) | | | | |
| | $SiO_2$ /%/ | 99.0 | 99.1 | 99.2 | 95.2 |
| | particle size (microns) | 5–20 | 5–20 | 5–20 | 10–20 |
| | particle density (g/cm$^3$) | ≦0.3 | ≦0.3 | ≦0.3 | ≦0.4 |
| | specific surface area (m$^2$/g) | 250–300 | 250–300 | 250–300 | 200–220 |
| | Efficiency of hydrolysis | | | | |
| 7 | Conversion of fluorine-ion into non-aqueous hydrogen fluoride in fluorine-containing sulphuric acid solution /%/ | 89.50 | 99.20 | 99.95 | 83.2 |
| 8 | Conversion of silicon ion into aerosol silicon dioxide, (%) | 79.55 | 95.20 | 99.90 | 72.2 |

EXAMPLE 5

This example illustrates the influence of the volume ratio of silicon tetrafluoride to sulphuric acid on the efficiency of silicon tetrafluoride hydrolysis and on the composition of the hydrolysis products.

Gaseous pure (100%) silicon tetrafluoride and an aqueous solution of sulphuric acid with a 60 wt.% concentration are continuously fed into the reactor 1 at a rate of silicon tetrafluoride flow in the reaction zone equal to 0.9 m/sec, at room temperature (+20° C.) under atmospheric pressure. The aqueous solution of sulphuric acid prior to introduction in the reactor 1 is preliminarily atomized in an injection sprayer 3 with compressed air until an aerosol state is attained. The contacting of the phases is run at various volume ratios of the silicon tetrafluoride to sulphuric acid, namely, 40:1, 62.5:1, and 80:1.

As a result of hydrolysis, performed by following the procedure described in Example 1, intermediate and end (commercial) products are attained. The composition of the products and efficiency of silicon tetrafluoride hydrolysis are shown in Table 2.

EXAMPLE 6

This example illustrates the influence of sulphuric acid concentration on the efficiency of silicon tetrafluoride hydrolysis and on the composition of the products of hydrolysis.

Gaseous pure (100%) silicon tetrafluoride and an aqueous solution of sulphuric acid are fed continuously into the reactor 1 at a volume ratio of silicon tetrafluoride to the solution of sulphuric acid equal to 62.5:1 at room temperature (+20° C.) under atmospheric pressure. The contacting of the phases is run at a rate of silicon tetrafluoride flow equal to 0.9 m/sec and concentration of sulphuric acid equal to 45%, 62.5%, and 70%. The sulphuric acid solution, prior to introduction into the reactor, is preliminarily atomized in an injection sprayer 3 with compressed air until an aerosol state is attained.

As a result of hydrolysis performed by following the procedure described in Example 1, intermediate and end (commercial) products are obtained. The composition of the products and efficiency of silicon tetrafluoride hydrolysis are presented in Table 3.

Table 2

| Composition of the products No. and hydrolysis efficiency | Volume ratio $SiF_4$ to $H_2SO_4$ | | |
|---|---|---|---|
| | 40.0:1 | 62.5:1 | 80:1 |
| 1 | 3 | 4 | 5 |
| Composition of the products | | | |
| 1 Fluorine-containing sulphuric acid solution (from the reactor 1) | | | |
| $H_2SO_4$ | 59.1 | 56.50 | 57.50 |
| HF | 12.20 | 15.50 | 21.00 |
| $H_2SiF_6$ | traces | 0.80 | 0.90 |
| $H_2SiO_3$ | traces | traces | traces |
| $H_2O$ | 20.90 | 27.20 | 20.60 |
| 2 Return sulphuric acid (from the reactor 4) | | | |
| $H_2SO_4$ | 72.80 | 67.28 | 73.50 |
| HF | 0.10 | 0.20 | 0.20 |
| $H_2O$ | 27.10 | 35.52 | 26.30 |
| $H_2SiF_6$ | traces | traces | traces |
| 3 "Crude" hydrogen fluoride (from the condenser 5) | | | |
| HF | 98.40 | 98.20 | 98.00 |
| $H_2SO_4$ | 0.10 | 0.30 | 0.50 |
| $H_2O$ | 1.50 | 1.20 | 1.40 |
| $H_2SiF_6$ | traces | 0.30 | 0.10 |
| 4 Non-aqueous hydrogen fluoride (from the condenser 7) | | | |
| HF | 99.9 | 99.9 | 99.9 |
| total $H_2O$, $H_2SiF_6$, $H_2SO_4$ | 0.1 | 0.1 | 0.1 |
| 5 Wet silicon dioxide (from the filter 9) | | | |
| $H_2SiO_3$ | 92.0 | 97.50 | 96.50 |
| $H_2SO_4$ | 0.90 | 0.80 | 1.20 |
| $H_2O$ | 3.20 | 1.10 | 0.30 |
| $H_2SiF_6$ | 3.90 | 0.60 | 2.10 |
| 6 Quality of crystalline dry silicon dioxide (from the apparatus 10) | | | |
| $SiO_2$ /%/ | 98.0 | 99.2 | 98.2 |
| particle size (microns) | 10–20 | 5–20 | 10–20 |
| specific surface area (m²/g) | 200–220 | 250–300 | 200–220 |
| particle density (g/cm³) | ≦0.4 | ≦0.3 | ≦0.4 |
| Hydrolysis efficiency | | | |
| 7 Conversion of fluorine-ion into non-aqueous hydrogen fluoride in fluorine-containing sulphuric acid solution (%) | 89.2 | 99.95 | 93.0 |
| 8 Conversion of silicon-ion into aerosol silicon-dioxide | 86.8 | 99.90 | 92.8 |

Table 3

| Composition of products and hydrolysis No. efficiency | Sulphuric acid concentration (%) | | |
|---|---|---|---|
| | 45% | 62.5% | 70% |
| 1 | 3 | 4 | 5 |
| Composition of the products | | | |
| 1 Fluorine-containing sulphuric acid solution (from the reactor 1) | | | |
| $H_2SO_4$ | 41.2 | 56.50 | 69.10 |
| HF | 13.0 | 15.50 | 8.0 |
| $H_2SiF_6$ | 5.3 | 0.80 | traces |
| $H_2SiO_3$ | traces | traces | traces |
| $H_2O$ | 40.5 | 27.2 | 22.9 |
| 2 Return sulphuric acid (from the reactor 4) | | | |
| $H_2SO_4$ | 50.3 | 67.25 | 75.10 |
| HF | 2.1 | 0.20 | 1.10 |
| $H_2O$ | 45.40 | 35.52 | 23.80 |
| $H_2SiF_6$ | 2.20 | traces | traces |
| 3 "Crude" of hydrogen fluoride (from the condenser 5) | | | |
| HF | 96.70 | 98.2 | 99.30 |
| $H_2SO_4$ | 0.60 | 0.3 | 0.10 |
| $H_2O$ | 2.10 | 1.20 | 0.60 |
| $H_2SiF_6$ | 0.60 | 0.30 | traces |
| 4 Non-aqueous hydrogen fluoride (from the condenser 7) | | | |
| HF | 99.9 | 99.9 | 99.9 |
| total $H_2O$, $H_2SiF_6$, $H_2SO_4$ | 0.1 | 0.1 | 0.1 |
| 5 Wet silicon dioxide (from the filter 9) | | | |
| $H_2SiO_3$ | 96.3 | 97.5 | 79.3 |
| $H_2SO_4$ | traces | 0.8 | traces |
| $H_2O$ | 1.30 | 1.1 | 2.3 |
| $H_2SiF_6$ | 2.4 | 0.6 | 8.40 |
| 6 Quality of crystalline dry silicon dioxide (from the apparatus 10) | | | |
| $SiO_2$(%) | 99.0 | 99.2 | 99.0 |
| particle size (microns) | 5–20 | 5–20 | 5–20 |
| particle density (g/m³) | 0.3 | 0.3 | 0.4 |
| specific surface area (m²/g) | 200–250 | 250–300 | 250–300 |
| Hydrolysis of efficiency | | | |
| 7 Conversion of fluorine-ion into non-aqueous hydrogen fluoride in fluorine-containing sulphuric acid solution (%) | 82.0 | 99.8 | 38.0 |
| 8 Conversion of silicon ion into aerosol silicon dioxide (%) | 92.3 | 98.9 | 42.1 |

What is claimed is:

1. A method of producing hydrogen fluoride and silicon dioxide, comprising the steps of subjecting silicon tetrafluoride to water hydrolysis at a temperature from minus 10° to plus 60° C. in the presence of an aqueous sulphuric acid solution in aerosol form by continuously passing gaseous $SiF_4$ at a flow rate of 0.2 to 4.0 m/sec into a hydrolysis zone containing said aerosol sulphuric acid solution having a concentration of from 45 to 73 wt. % sulphuric acid wherein the volume ratio of the gaseous $SiF_4$ to the sulphuric acid is 40:1 to 80:1 to form silicon dioxide and HF; simultaneously separating and withdrawing the silicon dioxide in an aerosol state as a first hydrolysis product and a silicon dioxide-free HF-containing sulphuric acid solution in liquid state and heating said HF-containing sulphuric acid solution at a temperature from 60° to 220° C. to produce hydrogen fluoride as a second hydrolysis product and a sulphuric acid solution which is recirculated to the hydrolysis step.

2. A method as claimed in claim 1, wherein the silicon tetrafluoride hydrolysis is run at a rate of silicon tetrafluoride flow from 0.7 to 0.9 m/sec.

3. A method as claimed in claim 1, wherein the silicon tetrafluoride hydrolysis is run at a temperature from +20° to +30° C.

4. A method as claimed in claim 1, wherein the silicon tetrafluoride hydrolysis is performed under atmospheric pressure.

* * * * *